United States Patent [19]
Calori et al.

[11] 3,880,688
[45] Apr. 29, 1975

[54] METHOD AND APPARATUS FOR THE CONTINUOUS PRODUCTION OF RING-SHAPED PIECES OF REINFORCED RUBBER

[75] Inventors: Giovanni Calori, Milan; Vincenzo Benatti, Ospitaletto, both of Italy

[73] Assignee: Industrie Pirelli S.p.A., Milan, Italy

[22] Filed: Mar. 2, 1972

[21] Appl. No.: 231,330

[30] Foreign Application Priority Data
Mar. 1, 1971  Italy ................................. 21179/71

[52] U.S. Cl. ........... 156/190; 152/361 R; 156/128 I; 156/193; 156/195; 156/250; 156/304; 156/425; 156/510; 242/7.02
[51] Int. Cl. ...................... B60c 9/00; B65h 81/04
[58] Field of Search ........... 156/187, 188, 190, 193, 156/195, 430, 431, 432, 184, 189, 128 I, 250, 304, 425, 510; 242/7.02, 7.21, 7.23; 152/359, 360, 361 R

[56] References Cited
UNITED STATES PATENTS

| | | | |
|---|---|---|---|
| 1,708,129 | 4/1929 | Gammeter ......................... | 156/187 |
| 2,731,067 | 1/1956 | Miller ............................ | 156/432 X |
| 3,281,304 | 10/1966 | Black et al. ....................... | 156/365 X |
| 3,580,784 | 5/1971 | Lee et al. ......................... | 156/184 |
| 3,616,819 | 11/1971 | Dunlap, Jr. et al. ............. | 156/190 X |
| 3,623,929 | 11/1971 | Wannamaker et al. ............. | 156/190 |
| 3,684,604 | 4/1972 | Sager ............................... | 156/193 X |
| 3,788,199 | 1/1974 | Sato et al. ......................... | 156/430 |
| 3,837,387 | 9/1974 | Mcnough et al. ................ | 152/361 R |
| R25,457 | 10/1963 | Lewis et al. ........................ | 156/425 |

*Primary Examiner*—Charles E. Van Horn
*Assistant Examiner*—Basil J. Lewris
*Attorney, Agent, or Firm*—Stevens, Davis, Miller & Mosher

[57] ABSTRACT

A continuous process is disclosed for the formation of ring-shaped pieces of reinforced rubber, useful as breakers in pneumatic tires. A rubber band having reinforcing elements or a plurality of said bands is wound around a cylindrical support in a cylindrical spiral shape. Certain portions of the cylindrical support are moved from the formation area to an exit area at such a speed synchronized with the reels containing the rubber band to result in a tubular body of uniform thickness and indefinite width. The tubular body is then cut into ring-shaped pieces and removed while the moving portions of the cylindrical support are recycled to the formation area. The apparatus is also disclosed. The moveable portions can be cylindrical, flexible metallic frames; cylindrical strips connected by chains or thin steel bands sustained by supports which are solid with the fixed part of the cylindrical support. A preferred embodiment has part of the moveable portions recycled within a defined cylindrical sector but outside the shaft.

8 Claims, 12 Drawing Figures

METHOD AND APPARATUS FOR THE CONTINUOUS PRODUCTION OF RING-SHAPED PIECES OF REINFORCED RUBBER

This invention relates to a method and apparatus for the continuous production of reinforced rubber ring-shaped pieces.

In this application, the term "ring-shaped piece" means a generic hollow body having a circular cross-section not necessarily of a height less than its diameter.

In the context of the present application, "reinforced rubber" means any elastomeric or plastomeric substance, whether natural or synthetic, having a structure reinforced with inserts of various kinds, both continuous (e.g., nylon or steel cord) as in rubberized fabrics or fragmentary (e.g., chopped glass).

More particularly, the invention relates to the porduction of breakers which, as in well know, are used in the construction of pneumatic tires having a radial carcass. At present these breakers are made from bands of rubber reinforced iwth insertions which are usually all placed in the same direction in each band. These bands are then cut into pieces having a parallelogram shape, after having been unwound onto a flat surface, so that the insertions form a certain preestablished angle with the longer sides of each piece of rubber band, for example with the machine described in Italian Patent No. 645,659 belonging to the present assignee. Various pieces cut from one band are then butt-spliced to form a new band. This stage is described for example in Italian Patent No. 776,910 of the same assignee. This new band is subsequently cut into suitable lengths. The various lengths which come from the original reinforced bands of rubber are then fed to a building machine to form the various layers of breakers. These lengths may be placed directly one after the other in a prestablished order across the mid-circumferential plane of a preshaped carcass of the radial type (for example as described in assignee's Italian Patent No. 709,689).

It is obvious that the above-described procedure errors in centering constitute a serious problem and that further difficulties arise due to the presence of the butt-splices between one layer and the next (which moreover must not overlap each other in the ring formed by the breaker). In addition, this manufacturing process is clearly quite discontinuous.

The purpose of the present invention is to indicate a method and equipment to make it possible to effect the continuous production of breakers and other ring-shaped pieces directly from bands of reinforced rubber obtained by calendering which are then wound on reels.

Accordingly, one of the first objects of the present invention is a continuous method for the production of ring-shaped pieces of reinforced rubber characterized by including the following steps:

continuously revolving at least one reel of rubber band provided with reinforcing elements along a closed trajectory on one plane, winding the band on a cylindrical support in a formation area, the axis of said cylindrical support being perpendicular to the trajectory plane;

continuously moving portions which form said cylindrical support along the axis of the latter towards an exit area in order to obtain a winding of the band in a cylindrical spiral, synchronizing the speeds of the reel and said moveable parts of the cylindrical support in accordance with the width of the band in order to produce a tubular body of uniform thickness and indefinite length;

cutting said tublar body into ring-shaped pieces in said exit area along a plurality of planes perpendicular to its axis; and removing said ring-shaped pieces while said moveable portions are recycles from said exit area to said formation area.

Another object of the present invention is an apparatus for the production of ring-shaped pieces of reinforced rubber comprising:

at least one reel of reinforced rubber band, moving continuously along a closed trajectory lying on one plane;

a cylindrical support, contained within said trajectory and with its axis perpendicular to said plane, composed of a plurality of moveable portions;

means for moving said reel and some of said moveable portions in the direction of the axis of the support, so that the band winds around the support in a cylindrical spiral, to form a tubular body of uniform thickness and indefinite length; and means for operating and synchronizing the movement of said reel and said moveable portions of the support characterized by the fact that:

the trajectory plane of said reel is stationary, while said moveable portions of the support move along the axis of the support itself;

said mean which operate said moveable parts of the cylindrical support make the latter continuously follow closed trajectories each of which is contained on a plane parallel to the axis of the support and is, at least for some of said moveable portions, inside the support, and having the apparatus provided with a cutting device for said tubular body, moveable around said cylindrical support so as to cut said tubular body along planes perpendicular to the axis of the support and capable of operating intermittently.

The present invention will be better understood through the following description which refers to some methods of effecting the continuous production of breakers, by way of non-limiting examples, as well as with the assistance of the enclosed drawings.

Figure 12:
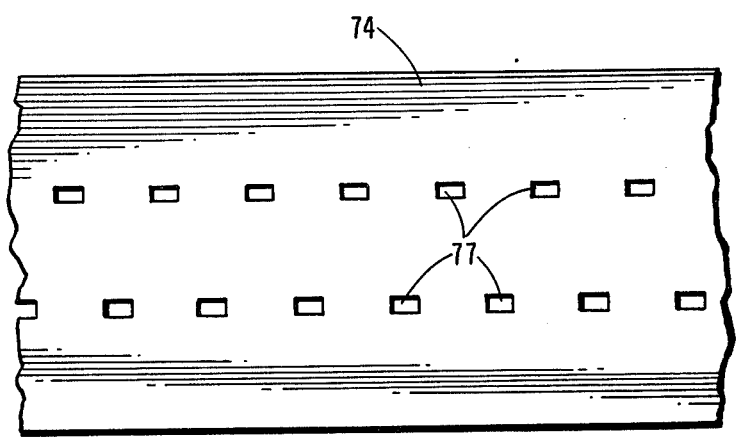
Figure 6:
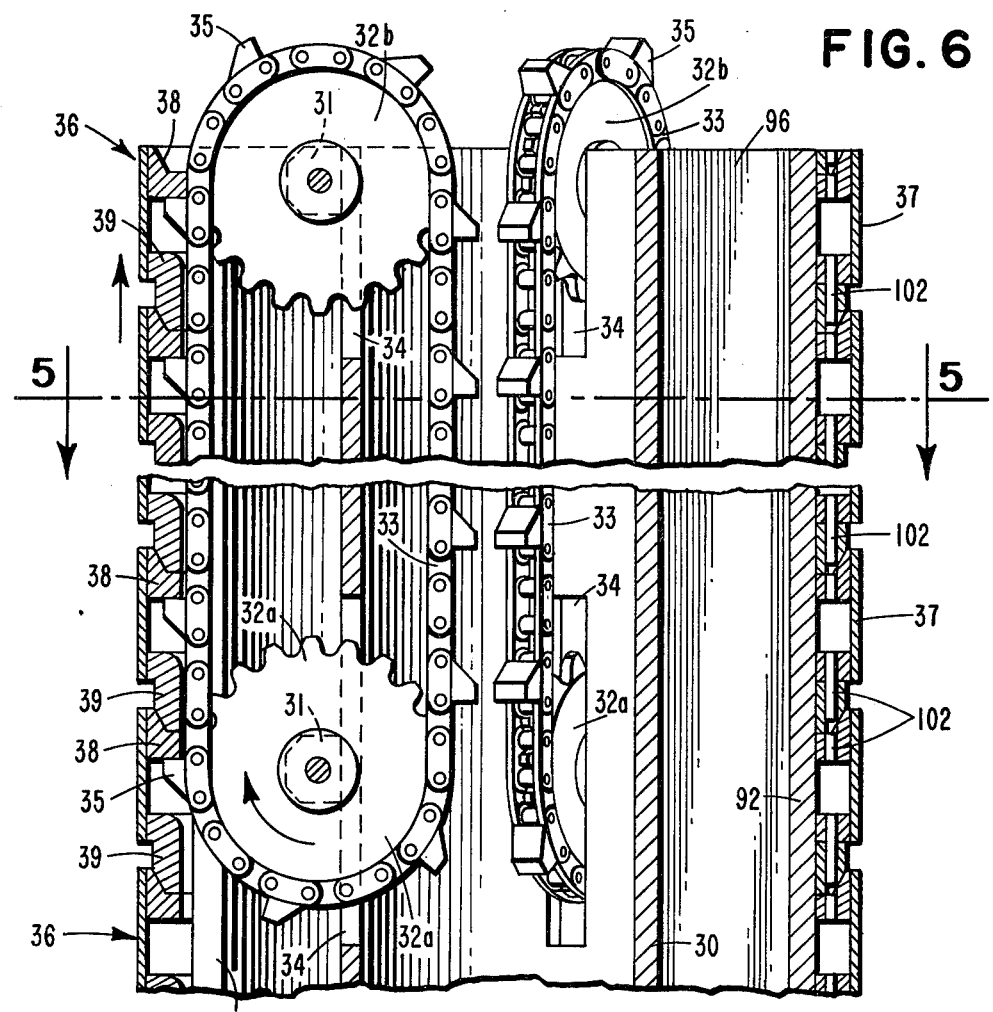
Figure 5:
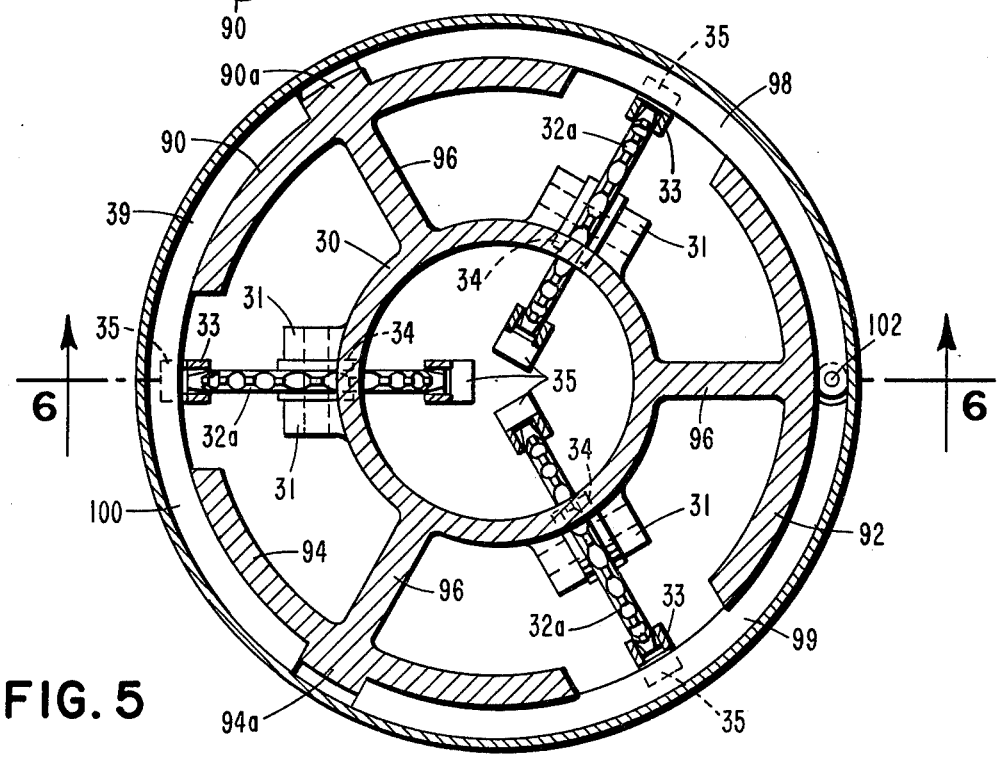
Figure 8:
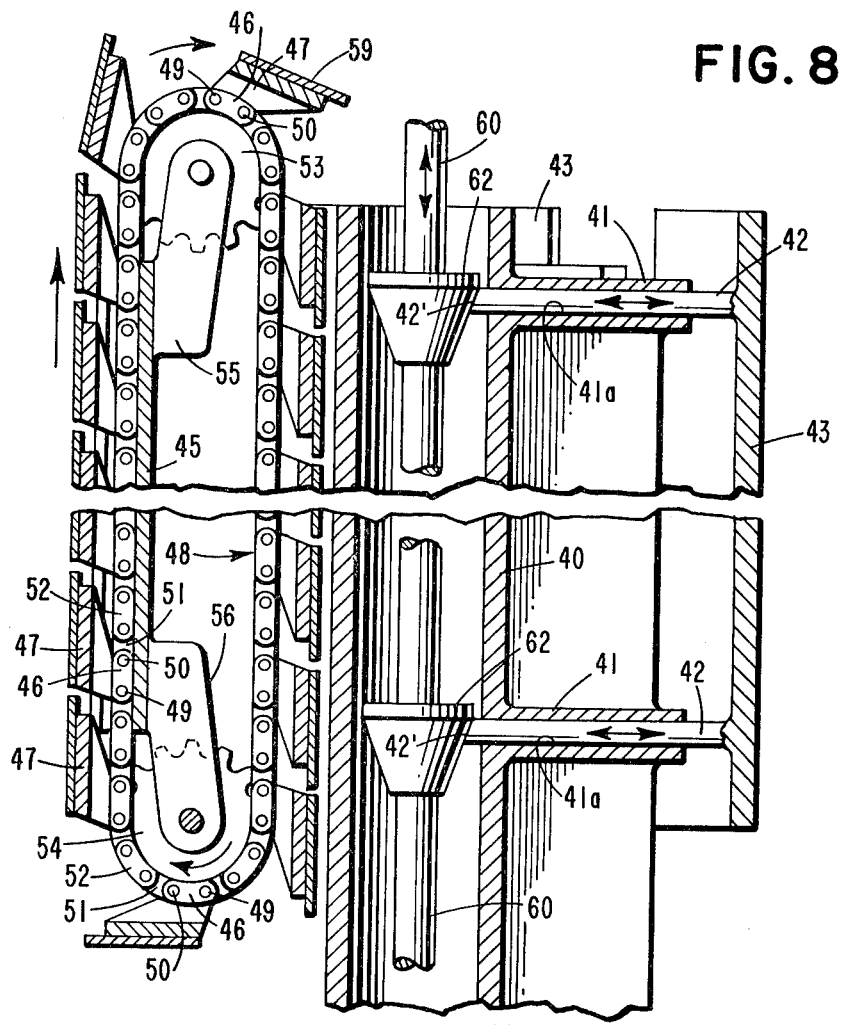
Figure 7:
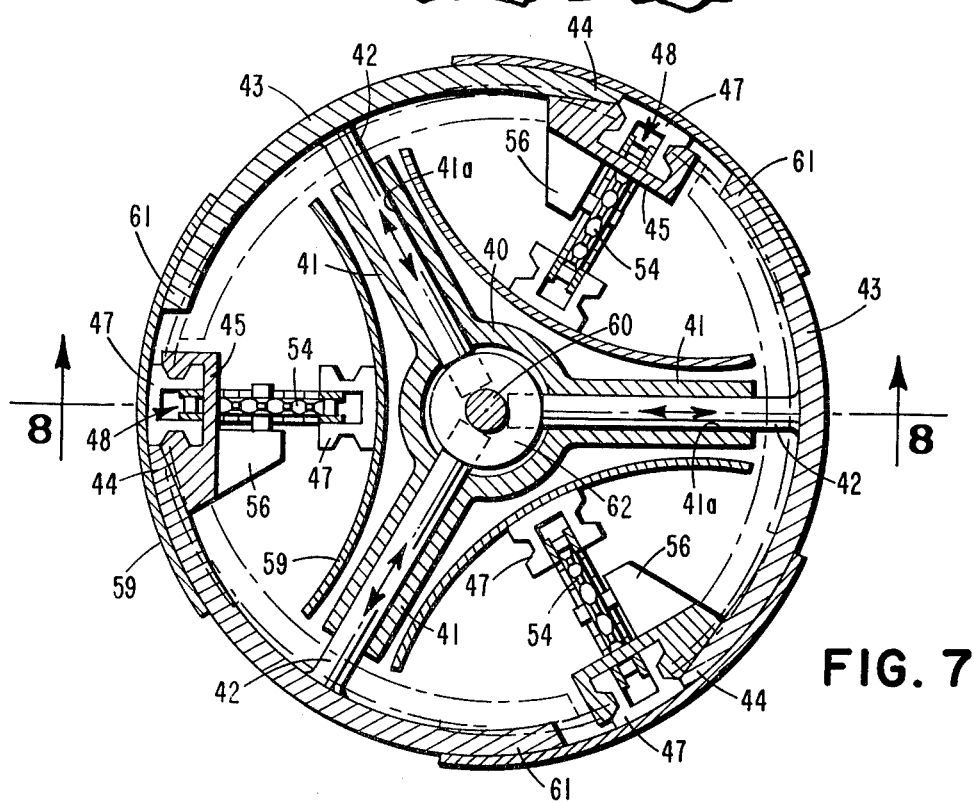
Figure 9:
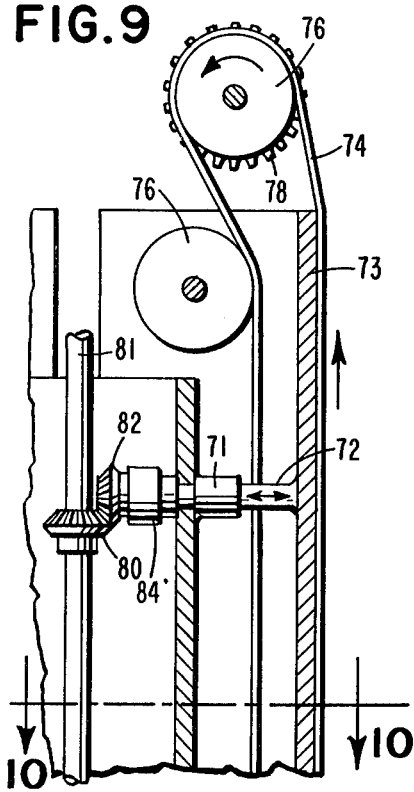
Figure 10:
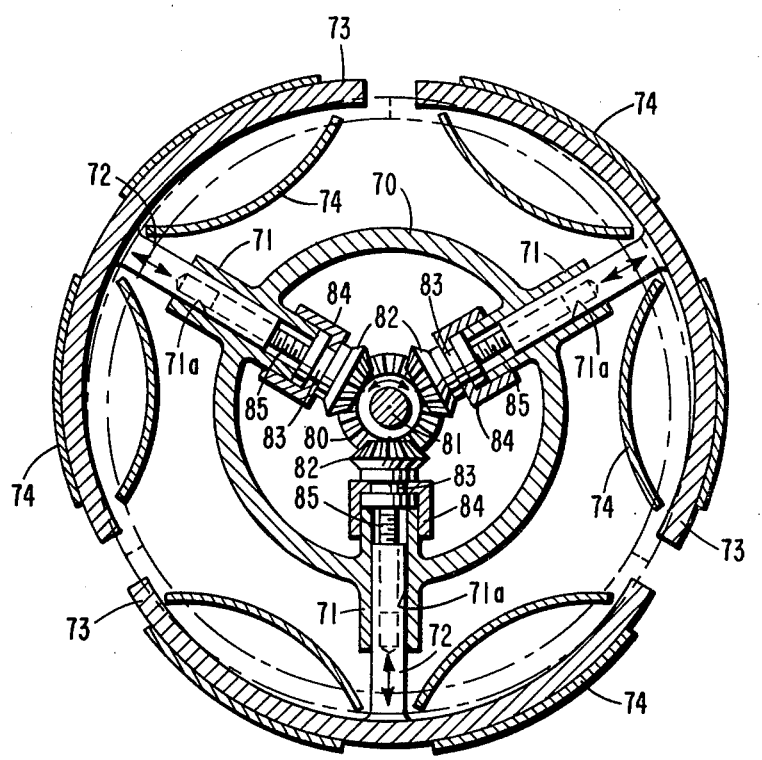
Figure 11:
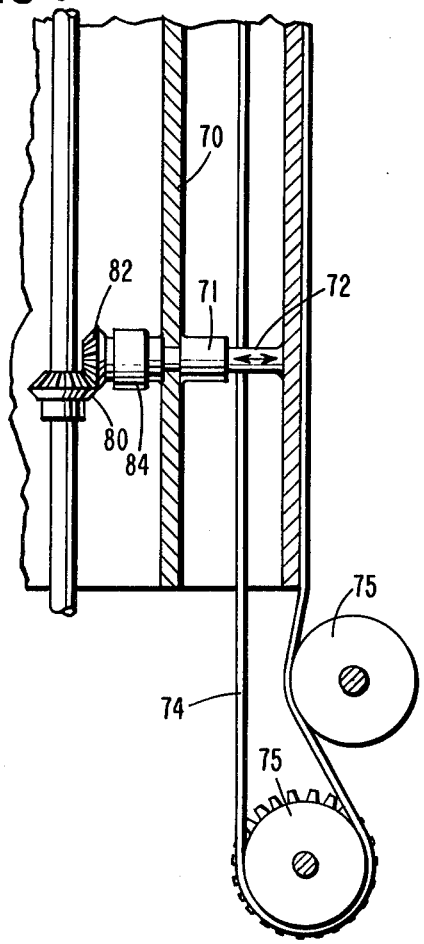
Figure 11:
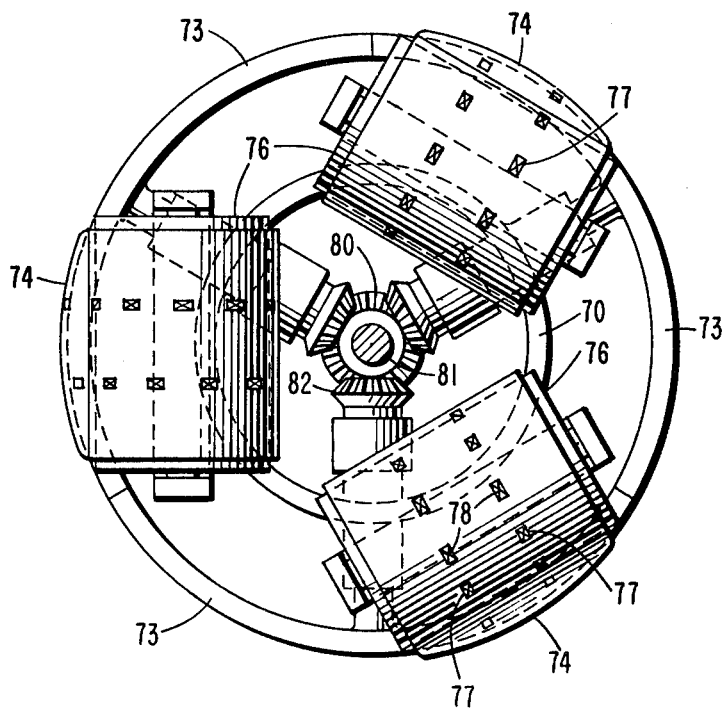

FIGS. 5 and 6 show a first embodiment of the cylindrical support, respectively a cross-section seen from above taken on line 5—5 of FIG. 6, and the vertical cross-section taken along plane 6—6 of FIG. 5;

FIGS. 7 and 8 show a second embodiment of the cylindrical support, respectively a cross-section seen from above and the vertical cross-section taken along plane 8—8 of FIG. 7;

FIGS. 9 to 12 show a third embodiment of the cylindrical support; in particular FIG. 9 is a half vertical section containing the axis of the cylindrical support, FIG. 10 is a cross-section taken along line 10—10 of FIG. 9, FIG. 11 is a top plane view, and FIG. 12 shows a detail of the moveable parts of the cylindrical support itself.

Figure 1:
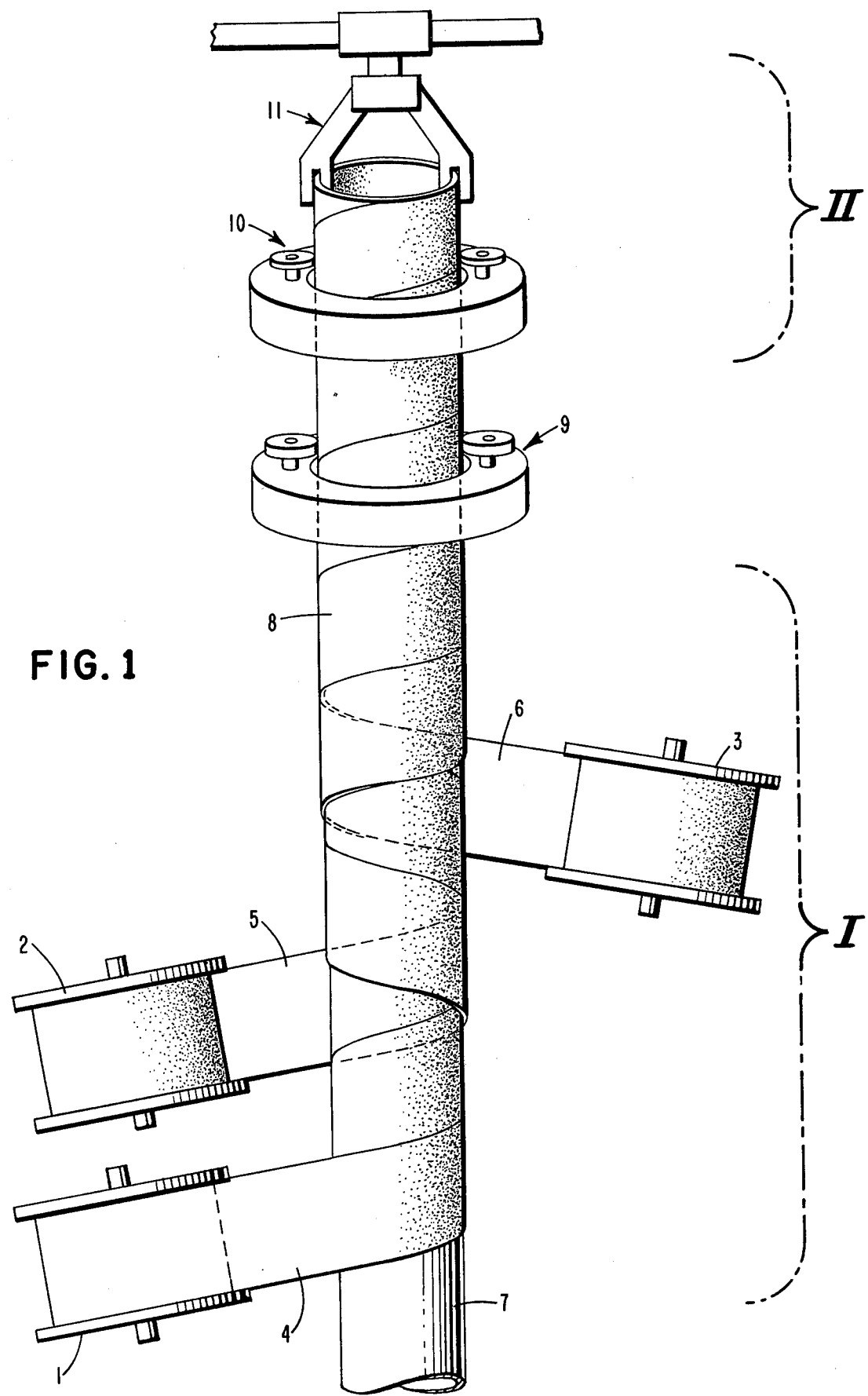
FIG. 1 shows a diagrammatic view of the present invention.

An examination of FIG. 1 shows reels 1, 2, 3 containing bands of reinforced rubber 4, 5, 6 which are maintained in continuous movement (by well-known means, not shown) along the same number of circular trajectories lying on as many stationary horizontal planes. At the center of the reels' trajectories is cylindrical support 7, having a vertical axis, i.e., perpendicular to the planes which contain the trajectories. The support 7 is composed of a plurality of portions (not shown in FIG. 1, but which will be described later), some of which are maintained in movement along the axis of support 7 from the bottom to top.

The rubber bands 4, 5, 6 are in this way fed towards support 7 and are wrapped around it, in correspondence with area I called the "formation area," in cylindrical spirals, the speed of the reels and that of the moveable parts of support 7 being synchronized so that at the end of said formation area I a tubular body of reinforced rubber 8 is obtained having therefore an indefinite length. Body 8 moves, together with the moveable portions of support 7, from formation area I towards an area II called the "exit area," in correspondence with which is a cutting device 10. With means and a method which will be described later, all (or only some, in accordance with the various embodiments) of said moveable portions of support 7 are recycled from area II to area I inside of support 7, while the cutting device 10, operating intermittently according to a pre-established sequence, cuts (along planes perpendicular to the vertical axis of support 7) the tubular body 8 into ring-shaped pieces of reinforced rubber. The ring-shaped pieces are gripped one at a time, during cutting, by device 11 which then transfers them for subsequent processing or to the place where they are to be used (for example if, as already mentioned, the ring-shaped pieces are breakers, they will be transferred by device 11 to well-known feeding devices or servicers of pneumatic tire building machines). The apparatus so briefly described comprises moreover a stitching device 9 which is in an intermediate position between area I and area II. The function of device 9 is to make the various layers of rubber adhere perfectly to each other, eliminating any air which may remain trapped during the formation stage of body 8, to impart a completely uniform thickness.

Already from the brief description of the operation given so far, two important advantages of the present invention clearly emerge. First of all there is absolute continuity of the method for the production of the ring-shaped pieces of reinforced rubber, particularly if they are to be used as breakers, when compared to prior methods. Second, those stages previously mentioned such as the cutting of the bands of rubberized fabric into pieces at pre-established angles, the butt-splicing of these pieces, the care which must be taken not to overlap the various splices when the breaker is placed on the tire carcass are absent from the present method. In fact, according to the present invention, bands 4, 5, 6 which are contained on reels 1, 2, 3 are simply those which come from the calendering operations; that is, if they are bands of rubberized fabric, the cords of the bands are all set at an angle of 0° to the edges of the band.

It must further be kept in mind that means (not shown) are provided which are capable of varying the angle (with respect to the axis of cylindrical support 7) at which each of the reinforced rubber bands 4, 5, 6 approach support 7, independently from one another. This occurs, obviously, when the equipment is at a standstill and the purpose thereof is to obtain ring-shaped pieces of varying geometrical arrangements.

In the more detailed description which follows, an illustration will first be given of the stitching devices for the tubular body and of the devices for the cutting and transfer of the reinforced rubber pieces obtained in accordance with the present invention; subsequently some embodiments of the cylindrical support will be described.

Figure 2:
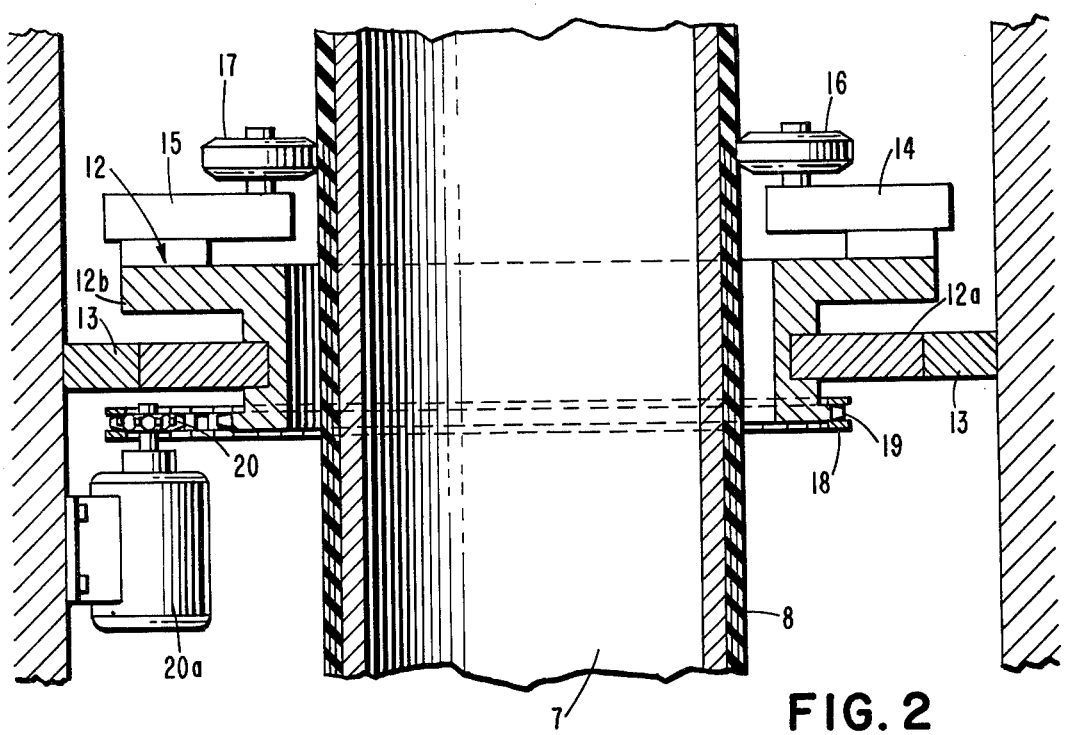
FIG. 2 shows the stitching device.

In fact with particular regard to the stitching device 9, from FIG. 2 it can be seen that it comprises a ring-shaped platform 12 placed above shaping area I, occupied by reels 1, 2, 3 which supply the reinforced rubber bands and is supported by brackets 13. In a position diametrically opposed to each other with respect to the tubular body 8 which has just been formed around cylindrical support 7, above platform 12 there are two actuators 14 and 15 to which are connected stitching discs 16 and 17 respectively, by means of resilient elements (not shown) in order to function in the best way even when the dimensions and structure of tubular body 8 vary. In all cases discs 16 and 17 always remain on a horizontal plane, i.e. perpendicular to the axis of cylindrical support 7. To effect the stitching it is possible both to make platform 12 revolve and to move actuators 14 and 15 on it.

In the version shown in FIG. 2, platform 12 is composed of two parts 12a, 12b, placed one above the other in such a way that part 12b may revolve (together with actuators 14 and 15) on part 12a placed below, since it is connected through chain 18, by means of ring gear 19, around its outer circumference, to gear 20 driven by geared motor 20a.

Figure 3:
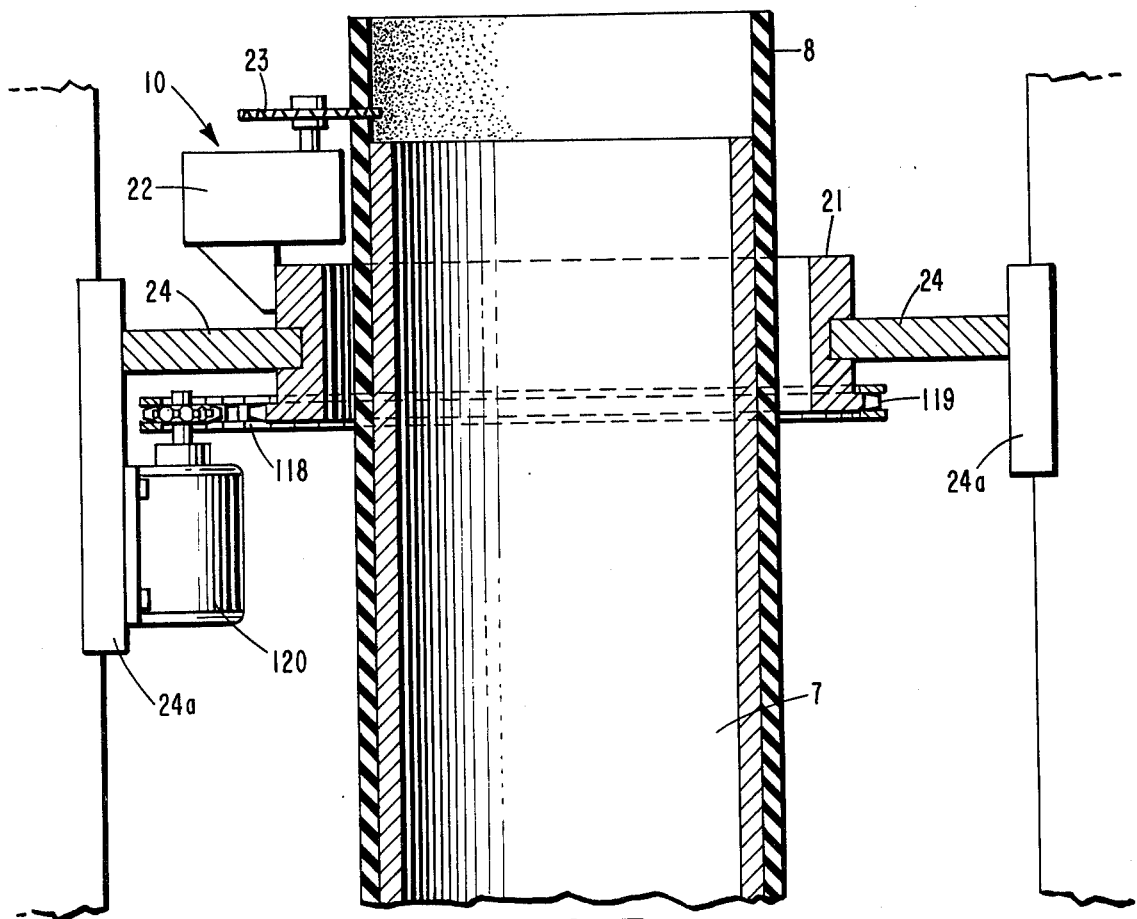
FIG. 3 shows the cutting device.

FIG. 3 shows cutting device 10 placed in correspondence with exit area II where as will be explained better below, the cutting of the ring-shaped pieces is carried out. Device 10 comprises a ring-shaped platform 21 upon which is mounted (with well-known means) a cutter 22, the circular blade 23 of which is always on a vertical axis. In turn platform 21 is supported by brackets 24. Cutter 22 revolves around the axis of support 7 driven by motor 120 through chain 118 about ring gear 119 integral with platform 21; it is possible that this movement may not always occur in the same direction and that cutter 22, when it has concluded the actual cut, may revolve in the opposite direction returning rapidly to its original position. Since the cutting of tubular body 8 into ring-shaped pieces must occur in accordance with planes perpendicular to the axis of support 7 which supplies the continuous translational component, well-known means (not shown) are provided for raising platform 21 intermittently with the assistance of guides 24a parallel to the axis of support 7 during the actual cutting phase and to return it subsequently at high speed to the original position. Due to the continuous nature of the formation of tubular body 8, it is advantageous that the means which operate the guides 24a are connected to means which supply the said translational component, in such a way that the advancing speed of the moveable parts of support 7 equals that of the raising of platform 21.

It is also possible to install two cutting devices on platform 21, in diametrically opposed positions, each of which effects the revolving movement around the axis of support 7 through 180°.

Figure 4:
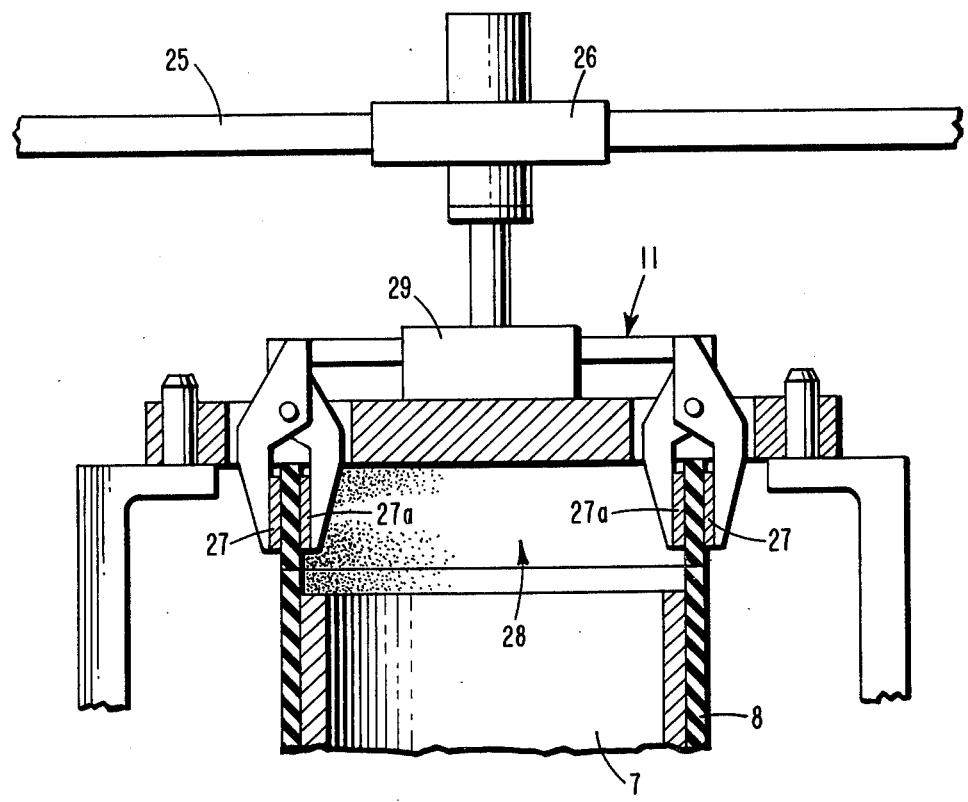
FIG. 4 shows the device for transferring the ring-shaped pieces.

Device 11 for the transfer of the ring-shaped pieces made in accordance with the present invention, as shown in FIG. 4, comprises a bridge crane 25 to the trolley 26 of which are connected, by means of a system of levers 29, at least two pairs of circular sectors 27, 27a placed so as to grip between them (like pliers) the tubular body 8 which is about to be cut. In this way it is not deformed by blade 23 of cutter 22 during the actual cutting operation. Moreover, as soon as the cutting phase is finished, the ring-shaped piece 28 so formed is detached from the underlying tubular body 8 and transferred by means of the combined movements of trolley 26 and bridge crane 25 to the already mentioned place of use, or else placed on a conveyor of known type which feeds, for example, the tire building machines.

FIGS. 5 to 12 show some embodiments of the most significant element of the present invention i.e. the cylindrical support with moveable parts which can be recycled. Although this support can be constructed in various ways, its characteristic feature is that it provides the translational component in the spiral winding of the reinforced rubber bands in the formation of the tubular body by means of moveable portions which may be recycled from the exit area to the formation area; for at least some of these portions this recycle takes place inside the cylindrical support itself.

In a first embodiment (FIGS. 5 and 6) the cylindrical support comprises a hollow vertical steel shaft 30 on which are pivoted, by means of appropriate brackets 31, three sets of sprocket wheels 32. Since these are contained on three radial planes of shaft 30, set at 120° from one another for reason of symmetry, only one is described here since the others are the same in construction and operation. Between wheel 32a, placed near the base of shaft 30, and wheel 32b, placed near the top, is stretched chain 33. Wheels 32a, 32b and chain 33 are partly inside shaft 30 which therefore has appropriate slits 34 in the plane which contains the sprocket wheels and the chain. At regular intervals teeth 35 are fixed to chain 33. Wheel 32a is the driving wheel in that it is operated by a geared motor not shown which is also set near the base of shaft 30.

Teeth 35 serve to sustain the cylindrical frames 36, each of which is composed of a steel band 37, stiffened in its upper and lower ends by two circumferential ribs, 38 and 39 respectively.

Cylindrical sections 90, 92, 94 concentric with shaft 30 and of equal length to shaft 30 are supported by radial, longitudinally continuous webs 96 integral with shaft 30. The outer diameter of said cylindrical sections is substantially equal to the inner diameter of the frames 36 and thus, said sections form a supporting surface for the longitudinal, sliding movement of frames 36.

Longitudinal ribs 90a and 94a integral with cylindrical segments 90, 94, respectively, act as keys to prevent radial motion of frames 36.

As can be seen from FIG. 5, ribs 38 and 39 are not continuous but are made in three sections 98, 99 and 100 of which two, 98 and 99, can be pivotally connected at 102 while the third section 100 is at a distance from the ends of the other two, (this space is filled by ribs 90a, 94a), in order to contribute to the flexibility of steel band 37 in the opening and closing of cylindrical frame 36 in a manner which will be explained below. When frame 36 is around shaft 30, it is sustained through upper rib 38 by teeth 35 (which are secured to chain 33, one for each of the three sections into which rib 38 is divided); therefore, in this first embodiment, frames 36 are, together with teeth 35, the movable parts of the cylindrical support of the apparatus. In turn, lower rib 39 of a frame 36 engages with upper rib 38 of the underlying frame 36, in such a way however that there remains a circumferential interval between steel band 37 of two frames 36 which come one after the other around shaft 30.

As regards the operation of this embodiment, the reinforced rubber bands 4, 5, 6 (not shown in FIGS. 5 and 6) are wound spirally on the surface of bands 37 of the cylindrical frames 36 which are moved by means of chains 33 from the bottom to the top of shaft 30 and thus provide the translational component of the spiral winding, while reels 1, 2, 3 (also not shown) revolve along circular trajectories around the axis of shaft 30 and therefore provide the rotational component of said winding. In this case the cutting of the tubular body into ring-shaped pieces of reinforced rubber is effected a little below sprocket wheel 32b, which is located at the top of shaft 30. The cutting line is in correspondence to said circumferential interval and so it is preferable that the height of each cylindrical frame 36 be equal to that of the ring-shaped piece one wishes to produce.

The transfer device 11 then removes one ring-shaped piece and the underlying cylindrical frame 36 from shaft 30. The ring-shaped piece of reinforced rubber is released by disconnecting the first two sections 98, 99 of each rib 38 and 39 from their mutual pivot pin, 102 and by virtue of the flexibility of the band 37 and of the space separating the third section 100 of the ribs from the other two, the frame is collapsed, the rubber ring is removed, and is then conveyed, as mentioned above, to the subsequent place of use. Frame 36 is recycled to the bottom of shaft 30 and, opened as before, is then placed around the base of shaft 30 where it is closed, hooking up again the first two sections of ribs 38 and 39, so that frame 36 is once more in the shape already seen and so that it may therefore resume its function as a moveable part of the cylindrical support. Frame 36 is thus recycled on the outside of the cylindrical support. In turn, teeth 35 are recycled, conducted by chain 33, on the inside of shaft 30, that is on the inside of the cylindrical support, following trajectories which (as also happens for frames 36) are closed and contained on planes parallel to the axis of the support.

A second embodiment of the cylindrical support is shown in FIGS. 7 and 8.

This second embodiment comprises a cylindrical vertical shaft 40 resting on the ground and provided with three vertical sets of radial ribs 41, set at 120° from each other, which are welded to the outer surface of shaft 40 and are moreover provided with holes 41a which are also radial. In view of the constructional and operational symmetry, only one part of this embodiment too is described. The cylindrical supports 43 are shown in their retracted position by dot-dash lines. In the holes 41a of ribs 41 are slidably mounted rods 42. Each set of rods sustains one rigid cylindrical section 43, the outer surface of which is smooth. At one end 44 of the section 43 which we shall call right (imaging an observer to be along the axis and above shaft 40) is rigidly fixed a shoe 45 which is set parallel to the vertical axis of shaft 40. Shoe 45 is cantilevered on end 44 and has a smooth-walled cavity, the axis of which is also vertical. Within this cavity a set of teeth 47 may slide, i.e. in a direction parallel to the axis shaft 40. Teeth 47 are connected to each other by means of chain 48. In particular, each tooth 47 is only sustained by one link 46 of chain 48, that is by the two pins 49 and 50, although its width is such as to overlap the next two links 51 and 52 with which it is not connected. Chain 48 meshes with two sprocket wheels 53 and 54, which have horizontal axes and which are sustained by means of brackets 55 and 56, joined to the top and bottom respectively of shoe 45. One of the sprocket wheels (preferably lower wheel 54) is driven by a geared motor (not shown).

To each tooth 47 is fixed a cylindrical strip 59 so that, during sliding, it lies on the right end 44 of one of the sections 43 and on the left end 61 of the adjacent section. Between one strip 59 and the next there is a certain circumferential interval, parallel to the axis of shaft 40.

As can be seen better in FIG. 8, this embodiment of the cylindrical support may be provided with means in order to obtain ring-shaped pieces having an internal diameter within a certain range of values. Rods 42 may slide radially in the holes 41a of ribs 41 by means of a rod 60 to which are rigidly connected conical cams 62 on the axis of shaft 40. By moving rod 60 and cams 62 down along said axis of shaft 40, rods 42 are pushed towards the outside and their bases 42' are in contact with conical cams 62. The perimeter enclosing the strips 59 therefore increases, each of the latter resting against right end 44 of cylindrical section by means of shoe 45 and running along the surface of left end 61 of the adjacent section; there is a consequent increase in the internal diameter of the ring-shaped pieces of reinforced rubber produced. It is advisable that, when the perimeter is at its minimum, shoe 45 together with one section 43 abuts against end 61 of the adjacent section as can be seen in dot-dash lines of FIG. 7.

This second embodiment of the cylindrical support functions as follows. Since the outside surface of strips 59 is smooth, as is also the outside surface of sections 43, when the above mentioned geared motor is put into operation chains 48 are kept in continuous movement by means of sprocket wheels 54, 53. In this movement, chains 48 carry along teeth 47 (and therefore also the cylindrical strips 59) which thus advance from the bottom to the top of shaft 40, running in the smooth-walled cavities of shoes 45. On arriving in correspondence with wheel 53, placed at the upper end of shaft 40, each strip 59 begins to move from the top towards the bottom, inside the cylindrical sections 43, i.e. inside the cylindrical support, in order to be recycled. This cycle therefore takes place along a trajectory parallel to the axis of shaft 40. Therefore in this embodiment strips 59 constitute the moveable portions of the cylindrical support, that is to say those which provide the translational component which permits (in accordance with what has previously been described) the formation of tubular body 8 by means of the winding, in a cylindrical spiral, of the bands of reinforced rubber.

As can be seen, in this second embodiment, if the geared drive motor has a constant number of revolutions, the speed at which the movable portions of the cylindrical support (i.e. strips 59) move is not constant but undergoes continuous changes around a nominal average value which are due to the presence of chains 48 and the sprocket wheels 53 and 54 between which the former are stretched. In order to achieve an even production of tubular body 8 of reinforced rubber, it is advisable that sprocket wheels 53 and 54 should have the greatest possible number of teeth so as to reduce the above variations in speeds to a minimum.

In this case the cutting of tubular body 8 into ring-shaped pieces takes place when the strips 59 are revolving around the sprocket wheels placed above to be recycled towards the inside of the cylindrical support, namely towards the inside of cylindrical sections 43. This is possible just for the very reason that each tooth 47 (and therefore each strip 59 fixed to it) is sustained by only one link 46 of chain 48 while its height comprises another two links (51 and 52), placed above the previous one in the part in which the translational component is supplied, so permitting the formation of tubular body 8, that is to say in the part of the trajectory of strip 59 outside the cylindrical support. In that case it is therefore impossible for there to be interference between tubular body 8 and strips 59 at the moment in which the latter begin to be recycled (see FIG. 8). For this purpose, however, the pairs of sections 27, 27a of the device for the transfer of the ring-shaped pieces (see FIG. 4) must very firmly grip the upper part of tubular body 8 in order that it may stand up to the strains imposed by the cutting device. It is also obvious that, with this second embodiment, it is possible to produce ring-shaped pieces of any height, i.e. quite apart from the height of strips 59.

A third embodiment of the cylindrical support is shown in FIGS. 9 to 12. It comprises a vertical cylindrical shaft 70, fixed to the ground and provided with three sets of radial ribs 71, off-set from one another by 120°, which are welded to the outside surface of shaft 70 and have holes 71a which are also radial. In view of the constructional symmetry only one part of this embodiment is described. Rods 72 fit into the holes 71a of ribs 71. Each set of rods sustains a rigid cylindrical section 73, the outside surface of which is smooth. On section 73, on opposite sides of rod 72, a thin steel band 74 lies in a vertical direction, i.e. parallel to the axis of shaft 70 (FIG. 9). Band 74 follows the curvature of section 73 and, in correspondence to the two ends of shaft 70, passes around the two pairs of rollers 75 and 76, supported with known means (not shown) by said section 73. The axis of these rollers is horizontal but rollers 75 which are in correspondence to the lower end of shaft 70 are outside the overall dimensions of section 73, while rollers 76, which are in correspondence to the upper end of shaft 70, are inside the overall dimensions of section 73 (FIGS. 9 and 11). Four rollers are used with said arrangement to facilitate the changes in curvature of band 74; the latter, in fact, has a curvature on the horizontal plane in the area in which it comes into contact with the outside surface of cylindrical section 73 and a curvature on the vertical plane in correspondence to the two rollers which effect the return.

Beneficially band 74 is provided, along two generatrices parallel to the axis of shaft 70, with two sets of small slots 77 into which fit cogs 78 with which the return rollers are provided (FIG. 12) in a way similar to reels of film. In this embodiment, there may be present idle cogged wheels (not shown) placed on the inside of cylindrical sections 73, their cogs engaging in slots 77. Their purpose is to sustain the tangential strains caused by the winding of reinforced rubber bands around the cylindrical support which would tend to make the bands 74 slip on the outside surface of cylindrical sections 73. One of said return rollers (preferably that in correspondence with the lower end of shaft 70) is connected to a geared driving motor (not shown). With this embodiment too means may be adopted, of the type previously mentioned with reference to FIG. 7, which permit the production of tubular pieces, the internal diameter of which is included in a certain range of values.

In all cases, the moveable parts of the cylindrical support in this third embodiment are bands 74 which move parallel to the axis of shaft 70, from the bottom upwards, lying on the outside surface of sections 73 when said geared motor is working. In turn, the recycle takes place between the two return rollers on the inside of sections 73.

The cutting of tubular body 7 into ring-shaped pieces is effected in the same way as described above for the second embodiment of the cylindrical support, i.e. when body 8 protrudes beyond rollers 76 placed above, that is to say above the cylindrical support. It is therefore possible, in this case also, to produce ring-shaped pieces of reinforced rubber of any height whatever and moreover having an internal diameter included within a certain range of values if use is made of mechanisms similar to that already described with regard to the second embodiment. This latter feature may also be obtained (in the way illustrated in FIG. 10) by means of bevel gears 80 mounted on a shaft 81 laid along the axis of shaft 70 and which drive bevel gears 82. Each gear 82 is provided with a grooved hub 83 which rotates in a thimble 84 attached to radial rib 71. Integral with hub 83 is a screw 85 which is threaded into the inner end of rod 72. By revolving shaft 81 (and therefore gears 80) in one direction or the other, the movement of rods 72 is obtained either towards the inside or the outside and therefore the perimeter enclosing sections 73 varies.

All the equipment described is always accompanied by a series of drives for actuating the various parts and these may be controlled by an electronic programmer, e.g. of the tape-fed type. It remains understood that, as well as those previously described, the protection provided by this application covers all the embodiments deriving from the inventive principles set out and accessible to any person skilled in the art. In particular each embodiment of the cylindrical support may be realized in such a way as to have a symmetry which differs from that described herein.

What is claimed is:

1. A continuous method for the production of ring-shaped pieces of reinforced rubber comprising
    continuously moving in a rectilinear vertical direction a plurality of continuous endless chains, each continuous endless chain being wound at least upon one pair of rollers rotatably mounted upon a fixed cylindrical support, the axis of which is vertical and cantilevered in correspondence with its lower end, said chains being arranged around said cylindrical support angularly offset by the same angle with respect to each other;
    providing a plurality of sectors which are movable along said support in said rectilinear vertical direction; continuously winding at least one rubber band of a band reel, provided with reinforcing elements, by revolving said reel around said axis of the cylindrical support in a substantially horizontal plane, to obtain a tubular body of indefinite length, each of said continuous endless chains being provided with drag means adapted to support and move each of said sectors substantially in said vertical rectilinear direction;
    longitudinally guiding said sectors on said cylindrical support as they move along the cylindrical support; and
    intermittently cutting said tubular body in correspondence with the upper end of said cylindrical support to obtain said ring-shaped pieces.

2. The method of claim 1, wherein each of said plurality of sectors is insertable around said cylindrical support and is intermittently inserted on said cylindrical support to be entrained by said drag means.

3. the method of claim 1, wherein said rubber band is wound upon sectors which are fixed to said endless chains, each sector resting at least on a portion of said cylindrical support.

4. An apparatus for the continuous production of ring-shaped pieces of reinforced rubber comprising:
    a plurality of continuous endless chains, each one of which is wound at least upon one pair of rollers, at least one of said rollers is motor driven, said rollers being rotatably mounted upon a fixed cylindrical support, whose axis is vertical and is cantilevered in correspondence with its lower end, each of said endless chains being movable in a rectilinear vertical direction and being arranged longitudinally and around said cylindrical support and angularly offset by the same angle with respect to each other;
    a plurality of sectors movable along said support in said vertical rectilinear direction, each of said endless chains being provided with entraining means adapted to support and move each of said sectors substantially in said rectilinear direction;
    at least one reel of rubber band provided with reinforcing elements, rotatable around said axis of said cylindrical support in a substantially horizontal plane to wind said band upon said sectors in order to form on said sectors a tubular body of indefinite length;
    stiff cylindrical wall sections forming part of said cylindrical support for guiding said sectors longitudinally on said cylindrical support; and
    means for intermittently cutting said tubular body to obtain said ring-shaped pieces.

5. The apparatus of claim 4 wherein each of said sectors is insertable around said cylindrical support.

6. The apparatus of claim 4, wherein said entraining means comprise stakes projecting from said endless chains, and said sectors are provided with stiffening parts adapted to cooperate with said stakes to allow the abutment of the sectors onto said stakes.

7. The apparatus of claim 4, wherein said sectors are hinged on said chains, said stiff cylindrical wall sections abutting at least a portion of each of said sectors hinged on said chains.

8. The apparatus of claim 4, wherein each pair of said rollers on which said endless chain is wound is supported by said fixed cylindrical support, and further comprising means for moving said cylindrical wall sections radially with respect to said vertical axis of the cylindrical support.

* * * * *